United States Patent Office 3,469,188
Patented Sept. 23, 1969

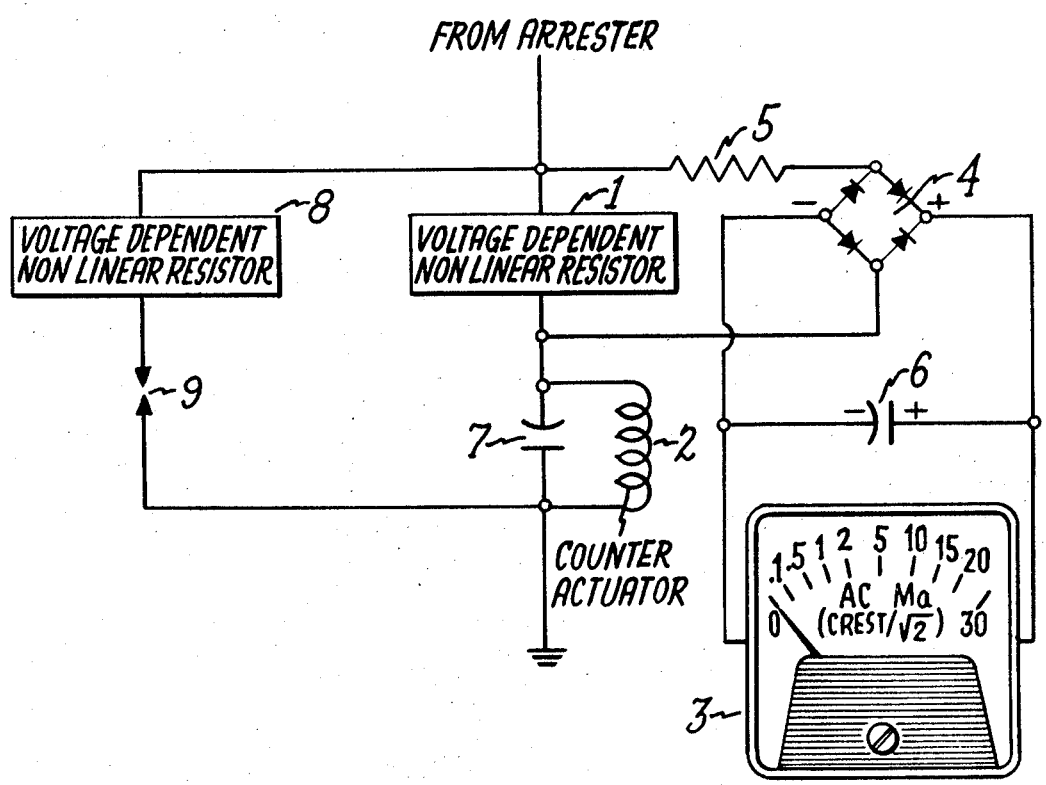

3,469,188
COMBINATION DISCHARGE COUNTER AND GRADING CURRENT MEASURING MEANS FOR A LIGHTNING ARRESTER
Theodore W. Hall, Pittsfield, Mass., assignor to General Electric Company, a corporation of New York
Filed July 13, 1966, Ser. No. 564,825
Int. Cl. G01r 19/00, 31/12, 27/28
U.S. Cl. 324—102                                    2 Claims

ABSTRACT OF THE DISCLOSURE

A circuit is provided for use with lightning arresters comprising a combination grading current measuring circuit and discharge voltage detecting arrangement. The curent measuring means is uniquely protected from damage due to overvoltage surges which the circuit is adapted to discharge to ground periodically. The meter is calibrated to give an accurate measurement of grading and leakage currents ranging from a fraction of a milliampere to several milliamperes.

---

This invention relates generally to lightning arresters and more particularly to improvements in monitors for lightning arresters.

A lightning arrester being a completely static silent device gives little or no indication of its condition or its service life from merely external visual inspection. There has, therefore, been developed an auxiliary monitoring device which will give some such information. The conventional monitor is a discharge counter. This has a numerical register which tells at a glance the total number of times a lightning arrester has been operated to discharge voltage surges.

There is a need for a more sophisticated monitor which will also measure the leakage and/or grading current of a lightning arrester. Leakage current is a measure of external surface contamination and grading current is a measure of the integrity of the internal voltage grading network of the lightning arrester which controls its sparkover voltage. The two are somewhat interrelated in that leakage current through surface contamination is a spurious grading current which can adversely affect the calibration of the internal voltage grading network.

As leakage and grading currents are measured in milliamperes and discharge currents in kiloamperes, there is a problem in providing a meter which will have a readable scale in milliamperes which will not be ruined by offscale deflections produced by discharge currents. The problem is further accentuated in that lightning arresters have a wide range of voltage ratings and further they are not usually operated at rated voltage but somewhere in a range between 75% and 100% of rated voltage. As leakage and grading current is proportional to applied voltage there is therefore a wide range or "normal" values of such currents for different arresters which such a monitor should be able to measure with a reasonable degree of accuracy.

In accordance with this invention, there is provided a novel and simple monitor circuit combining the functions of a discharge counter and a meter for grading and leakage currents in which at least one voltage dependent nonlinear resistor is common to different portions of the circuit which respectively provide the two functions.

As object of the invention is to provide a new and improved lightning arrester monitor.

Another object of the invention is to provide a new and improved means for measuring leakage and grading currents of a lightning arrester.

A further object of the invention is to provide a combination discharge counter and meter of grading and leakage currents of a lightning arrester.

The invention will be better understood from the following description taken in connection with the accompanying drawing.

Referring now to the single figure of the accompanying drawing which is a diagrammatic illustration of the invention, there is a main voltage dependent nonlinear resistor 1 in series circuit relation with which there is connected an actuator 2 for a counter (not shown). This actuator may be a simple solenoid coil. Connected in shunt circuit relation with the main nonlinear resistor 1 is a milliammeter 3, this latter connection preferably including a full wave bridge rectifier 4 with protective circuit elements for the meter including a linear resistor 5 in series with the input of the rectifier and an auxiliary capacitor 6 in shunt with the output of the rectifier.

The counter actuator 2 is shunted by a main energy storage rapacitor 7.

If desired, an additional or auxiliary voltage dependent nonlinear resistor 8 serially connected with a spark gap 9 may be connected in shunt circuit relation with the main resistor 1 and its serially connected capacitor 7. The elements 1, 2, 7, 8 and 9 comprise the discharge counter portion of the circuit which per se is generally similar to the subject matter of expired Whitehead Patent 2,200,-233.

In general, the operation of this portion of the circuit is such that the heavy discharge current flowing from the arrester (not shown) to ground will divide between the two parallel main branches of the circuit so as to limit their common voltage under discharge conditions. The portion of the discharge current which flows through the main nonlinear resistor 1 will rapidly charge the capacitor 7 because under these conditions the value of the resistance of resistor 1 will be low. The discharge only lasts for a very few microseconds which is too short a time for the counter to operate in. However, as soon as the discharge is over, the resistance of the main resistor 1 instantaneously increases to a comparatively high value so that in effect the capacitor 7 can only discharge through the counter actuator 2 so that this discharge current will then last long enough to produce one operation of the counter.

The combination of the nonlinearity of the main resistor 1 with the additional protective actions of the elements 5, 6, 8 and 9 prevents damage to the milliammeter 3 during the flow of heavy discharge currents from the arrester to ground. However, under normal operating conditions the comparatively small leakage and/or grading currents of the arrester flowing to ground through the main resistor 1 and the capacitor 7 will produce a voltage drop in the resistor 1 which is a function of the leakage and/or grading currents which is then measured by the meter 3. The normal range of such currents can be somewhere between $\frac{1}{10}$ milliampere and 5 milliamperes, and as can be seen from the drawing 5 milliamperes represents midscale deflection of the meter whose full scale deflection corresponds to 30 milliamperes so that there is a ratio of 1–6 between the currents corresponding to midscale and full scale deflection. This expanded logarithmic scale provides each readability for the low range of leakage and grading currents.

The rectifier 4, in combination with capacitor 6, results in the meter 3 responding substantially to the crest value of the voltage drop across resistor 1 produced by the alternating leakage and grading currents. As shown, however, the scale has been drawn to indicate crest/$\sqrt{2}$ values which correspond reasonably closely to the RMS values.

A suitable meter would be one capable of carrying up to 200 microamperes, a suitable rating of the auxiliary capacitor 6 would be 150 microfarads 12 volts D.C., the resistor 5 can have a resistance of 750,000 ohms and the main energy storage capacitor 7 can have a capacitance of 4 microfarads with a 1,000 volt D.C. rating and a gap 9 can have a spacing of .020".

While there have been shown and described particular embodiments of the invention, it will be obvious to those skilled in the art that changes and modifications may be made without departing from the invention, and therefore it is intended by the appended claims to cover all such changes and modifications as fall within the true spirit and scope of the invention.

What I claim as new and desire to secure by Letters Patent of the United States is:

1. A combination discharge counter and meter of grading and leakage currents of lightning arresters comprising, a voltage dependent nonlinear resistor and a capacitor serially connected with each other and adapted for connection in series with a lightning arrester between ground and apparatus that is to be protected from overvoltage surges, a counter actuating coil connected in shunt with said capacitor, a current meter connected in shunt circuit relation with said resistor, said resistor producing a logarithmic calibration of said meter so that midscale deflection of said meter corresponds to a current in said resistor of substantially less than half of the current in said resistor which produces full scale deflection of the meter, a full wave rectifier interposed between said voltage dependent nonlinear resistor and said meter so that said meter reads substantially the RMS value of alternating current in said voltage dependent resistor, a meter-protecting linear resistor serially connected with the input of said rectifier, and a meter protecting auxiliary capacitor connected in shunt with the output of said rectifier.

2. A combination as in claim 1 with a second voltage dependent nonlinear resistor and a spark gap serially connected with each other in shunt circuit relation with said first mentioned nonlinear resistor and its serially connected capacitor.

References Cited

UNITED STATES PATENTS

| | | | |
|---|---|---|---|
| 1,905,412 | 4/1933 | Kasson | 324—54 |
| 3,320,524 | 5/1967 | Miller | 324—54 |
| 2,129,524 | 9/1938 | Camilli | 324—132 XR |
| 2,200,233 | 5/1940 | Whitehead | 324—102 |
| 2,284,423 | 5/1942 | Hansell | 324—132 |
| 2,367,329 | 1/1945 | Berger | 340—253 |
| 2,528,744 | 11/1950 | Fehr | 340—253 |
| 2,586,815 | 2/1952 | Gunn | 324—54 XR |
| 3,215,997 | 11/1965 | Leavitt et al. | 340—253 |

FOREIGN PATENTS

| | | |
|---|---|---|
| 467,449 | 12/1951 | Italy. |
| 188,625 | 4/1964 | Sweden. |

GERARD R. STRECKER, Primary Examiner

U.S. Cl. X.R.

324—54, 72; 340—253